United States Patent
Sekine et al.

(10) Patent No.: US 8,987,542 B2
(45) Date of Patent: Mar. 24, 2015

(54) DECONTAMINATION METHOD AND APPARATUS FOR SOLID-STATE MATERIAL CONTAMINATED BY RADIOCESIUM

(71) Applicants: Ebara Industrial Cleaning Co., Ltd., Kawasaki (JP); Swing Corporation, Tokyo (JP)

(72) Inventors: Tomokazu Sekine, Kawasaki (JP); Tatsuo Shimomura, Kawasaki (JP); Takahiro Miama, Kawasaki (JP); Daichi Sakashita, Tokyo (JP); Kenichi Futami, Tokyo (JP)

(73) Assignees: Ebara Industrial Cleaning Co., Ltd., Kawasaki-shi (JP); Swing Corporation, Tokyo (JP)

( * ) Notice: Subject to any disclaimer, the term of this patent is extended or adjusted under 35 U.S.C. 154(b) by 122 days.

(21) Appl. No.: 13/671,011

(22) Filed: Nov. 7, 2012

(65) Prior Publication Data

US 2013/0237741 A1 Sep. 12, 2013

(30) Foreign Application Priority Data

Nov. 30, 2011 (JP) ................................. 2011-261983
Mar. 29, 2012 (JP) ................................. 2012-075497

(51) Int. Cl.
*G21F 9/28* (2006.01)
*G21F 9/30* (2006.01)
*B09C 1/00* (2006.01)
*G21F 9/00* (2006.01)
*B09C 1/08* (2006.01)

(52) U.S. Cl.
CPC ... *G21F 9/30* (2013.01); *B09C 1/00* (2013.01); *G21F 9/001* (2013.01); *G21F 9/28* (2013.01); *B09C 1/08* (2013.01)
USPC .............................. 588/18; 588/310; 588/412

(58) Field of Classification Search
USPC .............................. 588/18, 10, 313, 410, 412
See application file for complete search history.

(56) References Cited

U.S. PATENT DOCUMENTS 5,489,734 A * 2/1996 Nagel et al. ........................ 588/1

FOREIGN PATENT DOCUMENTS

JP 6-39055 2/1994

OTHER PUBLICATIONS

Website of national Institute of Advanced Industrial Science and Technology <Research Result> Presented on Aug. 31, 2011, http://www.aist.go.jp/aist_j/press_release/pr2011/pr20110831/pr20110831.html 8 pages (with English Translation).
Asahi Shimbun,http://www.asahi.com/national/update/1026/TKY201110260418.htmlMorning edition, Oct. 27, 2011, 4 pages (with English Translation).
Nihon KeizaiShimbun (Nikkei), http://www.nikkei.com/news/category/article/g=96958A9C93819490E0E5E27E . . . http://www.nikkei.com/news/print-article/?R_FLG=0&bf=0 &ng=DGXNASFB27059 . . . Oct. 31, 2011, 3 pages (with English Translation).
Yomiuri Shimbun, http://germoney15.blog69.fc2.com/blog-entry-2773.html Evening Edition, Nov. 7, 2011, 2 pages (with English Translation).
J Wauters et al. Availability of Radiocaesium in soils: a new methodology, The science of the Total Enviroment 157 (1994) 239-248.
Hirofumi Tsukada et al. Concentration and specific activity of fallout $^{137}$Cs in extracted and particle-size fractions of cultivated soils, The Journal of Environmental Radioactivity 99 (2008) 875-881.
Bruno Delvaux et al., Fate of Radiocesium in Soil and Rhizosphere, "Trace Elements in the Rhizosphere" edited by George R. Gobran, Walter W. Wenzel, and EnzoLombi, CRC Press 2001, 6 pages.

* cited by examiner

*Primary Examiner* — Edward Johnson
(74) *Attorney, Agent, or Firm* — Oblon, McClelland, Maier & Neustadt, L.L.P.

(57) ABSTRACT

A decontamination method of solid-state material contaminated by radiocesium comprising bringing the solid-state material containing radiocesium in contact with a first processing solution and preferably eluting cesium ion from the solid-state material to the liquid phase under the presence of potassium ion or ammonium ion.

15 Claims, 3 Drawing Sheets

Figure 1

Mechanism of absorption of cesium into layered clay mineral

DECONTAMINATION METHOD AND APPARATUS FOR SOLID-STATE MATERIAL CONTAMINATED BY RADIOCESIUM

TECHNICAL FIELD

The present invention relates to a technology for decontaminating a solid-state material contaminated by radiocesium released from nuclear power plants and the like, specifically to a decontamination method and a decontamination apparatus for separating and removing cesium from the solid-state material by putting the solid-state material in contact with an aqueous solution and eluting cesium to the liquid phase.

BACKGROUND ART

One way of cleaning and restoring solid-state materials contaminated by radiocesium, especially soil, is to stabilize cesium found in a stratum or seabed that contains carbonate by using calcium chloride solution to keep cesium from being re-fluidized by groundwater (Patent Document 1). Other presented methods include a method for extracting cesium using acid under increased pressure and heat (Non-patent Document 1), a method for vaporizing cesium in the gas phase by heating it to 800° C. under aeration with vapor (Non-patent Document 2), a method for extracting cesium using carbonated water (Non-patent Document 3), and a method for extracting cesium using oxalic acid (Non-patent Document 4).

The method of Patent Document 1 is an insolubilization technology for cesium, not a removal technology. Of the methods of Non-patent Documents 1 to 4, which are removal technologies for cesium, the methods of Non-patent Documents 1 and 2 require a high temperature and pressure or steaming/baking under high temperature, necessitating the use of a large energy for processing lots of soil. Additionally, Non-patent Documents 3 and 4 do not disclose the processing conditions in detail, and the present inventors retested the process using the actual contaminated soil (fine-grained fraction) under common conditions to find that the decrease in the radiation dose remained around 10 to 33% (refer to the Comparative Examples).

It is considered that volume reduction of soil contaminated by radiocesium is possible using a method of washing/classification according to the method for processing solid-state material contaminated by heavy metal, and directly re-burying the coarse-grained fraction (gravel, sand), which is considered to have relatively low specific surface area and relatively low contamination concentration; but, the process leaves the fine-grained fraction (silt, clay) as contamination-concentrated soil. For a mass removal of soil, the fine-grained fraction soil must also undergo cesium desorption and decontamination. In addition, the finding of crushed stone contaminated by a high concentration of radiocesium (i.e. maximum of 214,000 becquerel/kg) at the rock quarry in the Fukushima Prefecture in February 2012 spread the understanding that the coarse-grained fraction obtained after the soil has been washed must also undergo cesium desorption and decontamination.

Coarse-grained fraction (gravel, sand) obtained after the washing/classification process include silicate minerals such as amphibole, andesite, feldspar, calcite; amorphous minerals; and silt and clay minerals formed by partial weathering of the surface of the preceding minerals. Of these, the mineral considered as the major agent in cesium adsorption is the clay mineral developing on or attached to the surface of the sand gravel. The fine-grained fraction (silt, clay) consists of minerals, such as quartz, cristobalite, feldspar, calcite, and layered clay minerals such as amorphous mineral and micas, smectites, vermiculites. Of these, the minerals recognized as the major agent in cesium adsorption are the layered clay minerals, such as amorphous mineral and micas, smectites, and vermiculites (Non-patent Document 5).

It is reported that 70% of cesium in soil is adsorbed in a strongly fixed state to the clay mineral, 20% thereof is adsorbed to an organic material, and the remaining 10% is present in an ion-exchange state (Non-patent Document 6).

Figure 1:
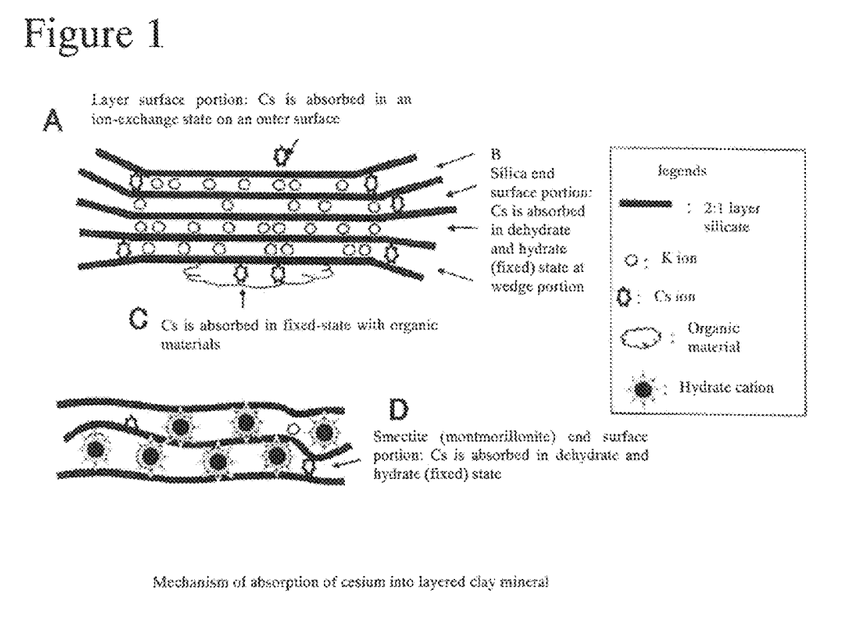
FIG. 1 is an illustrative drawing of the mechanism of cesium adsorption to layered clay mineral.

The layered clay mineral involved in the cesium adsorption is referred to as the 2:1 layered silicate; it contains thin sheet-like layers stacked on top of each other; and it has negative charge. Cations, such as hydrogen ion, potassium ion and sodium ion, are inserted between layers to cancel the negative charge, and the cesium ion is adsorbed in an ion-exchange state to the end surface portion between layers or the outer surface of the layers (layer surface area) (FIG. 1). The problem is that the tetrahedron arrangement of silica ($SiO_4$) in the layered silicate sheet is structured with continuous openings of a suitable size (adsorption sites) to entrap cesium ion or ammonium ion. When such ions enter the end surface portion between layers, they are gradually become dehydrated (a phenomenon in which water molecules around the ions are detached) and enter the above adsorption sites (Non-patent Document 7). The dehydration flattens the sheet to a unit sheet thickness (i.e., the total thickness of one sheet and the space between layers. It varies according to the space between layers) of approximately 1 nm from approximately 1.5 nm when hydrated ions are contained, and inhibits hydrated ions from physically entering the sheet. That is how cesium is adsorbed in a fixed state to clay mineral, preventing the above 70% of cesium from being extracted even when a high concentration of hydrogen ion (acid) and sodium ion (alkali) is supplied, since the ions are hydrated ions. That is the main reason why the removal ratio of cesium from soil after a usual washing by water, acid or alkali remains at approximately 10 to 30%, and no effective solution to the problem is found yet.

In addition, the soil that adsorbed cesium, especially the above fine-grained fraction having an extremely small particle size of 75 μm or lower, tends to disperse or effuse by natural causes such as wind and rain or human causes such as the decontamination work. Such soil flows into gutters, sewages and rivers to be carried into a filter plant or a sewage plant, and ends in the sludge discharged from the plants where it becomes the main radioactive contaminant of sludge and its burned ash. In addition, the soil accumulates at the bottom of rivers, lakes and harbors (especially at a high concentration around the mouth of the river) where it becomes the main radioactive contaminant for the sediment (hedoro).

The main contaminated matter of sludge in water supply and sewage systems and its burned ash, sediments in rivers, lakes, drainage systems, water ways, canals, harbors and the like, and hedoro is the same as that of soil, or is derived from soil. Hence, when the above sludge, sediments and hedoro are subjected to the usual washing by water, acid or alkali, the removal ratio of cesium remains at approximately 10 to 30%.

CITATION LIST

Patent Document

Patent Document 1: Japanese unexamined patent publication No. H6-039055

Non-Patent Documents

Non-patent Document 1: Website of National Institute of Advanced Industrial Science and Technology <Research Result> Presented on Aug. 31, 2011 http://www.aist.go.jp/aist_j/press_release/pr2011/pr20110831/pr20110831.html Non-patent Document 2: Asahi Shimbun, Oct. 27, 2011, morning edition http://www.asahi.com/special/10005/TKY201110260418.html Non-patent Document 3: Nihon Keizai Shimbun (Nikkei), Oct. 31, 2011 http://www.nikkei.com/news/category/article Non-patent Document 4: Yomiuri Shimbun, Nov. 7, 2011, evening edition http://getmoney15.blog69.fc2.com/blog-entry-2773.html Non-patent Document 5: Wauters et al., Sci. Total Environ. 157, (1994) 239-248

Non-patent Document 6: Tsukada et al., Journal of Environmental Radioactivity, 99, (2008) 875-881

Non-patent Document 7: "Trace Elements in the Rhizosphere" Edited by George R. Gobran, Walter W. Wenzel, and Enzo Lombi CRC Press 2001 p 68

SUMMARY OF INVENTION

Technical Problem

The object of the present invention is to provide an efficient decontamination method or apparatus for solid-state materials contaminated by radiocesium such as soil, sludge in water supply and sewage systems and its burned ash, sediments in rivers, lakes, drainage systems, water ways, canals, harbors and the like, and hedoro.

Solution to Problem

In order to solve the above problem, the present inventors conducted intensive studies and found that radiocesium can be efficiently removed by the decontamination method and apparatus of the present invention. The decontamination mechanism is explained below using soil as an example, but the mechanism can be applied to the decontamination of solid-state materials such as sludge in water supply and sewage systems and its burned ash, sediments in rivers, lakes, drainage systems, water ways, canals, harbors and the like, and hedoro.

In the cesium-contaminated soil, the end surface portion between layers of the layered clay mineral composed of 2:1 layered silicate stacked on top of each other, is flattened and the cesium ion is adsorbed in a fixed state. It was found that when fluorine ion contacts with such contaminated soil, the end surface portion between layers is deformed or destroyed, which allows an extraction of cesium adsorbed in a fixed state. It was also found that the co-existence of potassium ion, ammonium ion, sodium ion or hydrogen ion can prevent re-adsorption of cesium, by cations like potassium ion and ammonium ion covering the adsorption site, and such co-existence is effective in decontaminating radiocesium-contaminated soil.

The "fluorine ion" of the present invention refers to both HF and F— in the following Equilibrium Reaction Formula (1).

Reaction Formula (1)

HF on the left side of Reaction Formula (1) and F⁻ on the right side are in an equilibrium relationship, and the proportion of their presence change depending on the pH, so the concentration of one cannot be determined unambiguously. Hence, in actual processes intended by the present invention, the fluorine ion concentration will be defined as the total initial liquid phase concentration of the two.

The present invention provides a decontamination method for a solid-state material containing radiocesium comprising bringing the solid-state material containing radiocesium as the contaminant into contact with a first process liquid containing fluorine ion to elute cesium from the solid-state material into the liquid phase. Embodiments for "bringing ... into contact with a ... process liquid" include dispersing or immersing the solid-state material in the process liquid, or passing the process liquid through or sprinkling the process liquid on the solid-state material.

A processed solid, which is the solid after cesium ion is eluted, should preferably be further brought into contact with a second process liquid containing an acidic material to elute cesium remaining in the processed solid.

More preferably, the elution of cesium in the decontamination method of the present invention should be carried out under the co-existence of at least one of potassium ion, ammonium ion, sodium ion or hydrogen ion. Potassium ion, ammonium ion, sodium ion or hydrogen ion can be contained in the first process liquid or the second process liquid, or it can be added separately as salt.

In the present invention, fluorine ion is brought into contact with contaminated soil to corrode and partially destroy the silicate sheet structure of the end surface portion of the layered clay mineral. Potassium ion, ammonium ion, sodium ion or hydrogen ion covers the adsorption sites on the end surface portion and the layer surface area, and prevents the re-adsorption of cesium, desorbed during the extraction reaction, to the clay mineral. Potassium ion, ammonium ion, sodium ion or hydrogen ion should be preferably contained in the initial liquid phase at a total ion concentration of 0.1 g/L or higher.

On the other hand, the potassium ion, ammonium ion, sodium ion or hydrogen ion inhibits the cesium adsorption in the cesium adsorption step required for collecting cesium from the process liquid. Hence, it is preferable for the ions to be contained in the initial liquid phase at a total concentration of 110 g/L or lower.

Examples of preferable fluorine ions to be used include ions derived from fluorides selected from hydrogen fluoride gas, hydrofluoric acid and its salt, fluorosilicate and its salt. Specific examples of the salt of hydrofluoric acid include ammonium hydrogen fluoride, potassium hydrogen fluoride, potassium fluoride and sodium hydrogen fluoride. Specific examples of fluorosilicate include hexafluorosilicate. Specific examples of the salt of fluorosilicate include sodium hexafluorosilicate and potassium hexafluorosilicate. Ammonium hydrogen fluoride is especially suited for the decontamination method of the present invention, since it is commercially available as an etchant and it has strong capability to decompose a silicate salt. Further, potassium hydrogen fluoride, potassium fluoride and potassium hexafluorosilicate are advantageous since potassium can be added together.

The hydrogen fluoride gas can be used by passing it through the first process liquid, or by adding it to the gas phase in the container and mixing with the liquid phase. Hydrofluoric acid and its salt, and fluorosilicate and its salt are easier to handle than hydrogen fluoride gas, and they can be used as an aqueous solution. A hexafluorosilicate salt is a material added to tap water in the US, so it is preferable for use.

Acidic materials contained in the second process liquid include sulfuric acid, hydrochloric acid, nitric acid, phosphoric acid, sulfamic acid, and organic acid, such as, formic acid, acetic acid, lactic acid, citric acid, oxalic acid, terephthalic acid, methansulfonic acid. Sulfuric acid is especially suited for the decontamination method of the present invention, since it has strong capability to dissolve transition metal oxides in soil, such as iron oxide in soil.

Solid-state materials that the decontamination method of the present invention can be applied to preferably include soils containing clay mineral, sludge in water supply and sewage system and its burned ash, sediments in rivers, lakes, drainage systems, water ways, canals, harbors and the like, and hedoro. Specifically, soils preferably include a fine-grained fraction (silt and clay) and a coarse-grained fraction (sand, sand gravel, gravel) obtained after the soil washing/classification process. The classification of soil follows the definition of JIS A1204, in which the soil with a particle size of 75 µm or lower in the screening test is called "silt, clay", that with a particle size of 75 µm to 250 µm is called the "fine-grained sand", that with a particle size of 250 µm to 850 µm is called the "medium-grained sand", that with a particle size of 850 µm to 2 mm is called the "coarse sand" and that with a particle size of 2 mm or higher is called "granule". A solid-state material with high concentration of organic matters should preferably be heated in advance at 600° C. or higher to decompose the organic matter.

Further, it is preferable to sonicate the first and/or second process liquid (respectively referred to also as the first eluate and the second eluate).

The present invention also provides a decontamination apparatus for a solid-state material contaminated by radiocesium comprising a solid-state material introduction means to introduce a solid-state material containing radiocesium, a fluoride introduction means to introduce fluoride into the solid-state material, a first processing vessel to form a first eluate containing the solid-state material and elute cesium ion from the solid-state material to a liquid phase, and a first solid-liquid separation device to separate the first eluate from the first processing vessel to solid and liquid.

It is preferable to further comprise a first cesium adsorption tower to adsorb cesium from a supernatant provided by the first solid-liquid separation device, and a first regenerated solution circulation line to return a first regenerated solution resulting from cesium adsorption and removal by the first cesium adsorption tower into the first processing vessel.

It is preferable for the decontamination apparatus of the present invention to further comprise a second processing vessel to form a second eluate by bringing a processed solid produced by the first solid-liquid separation device in contact with the second process liquid containing an acidic material, a second process liquid introduction means to introduce the second process liquid into the second processing vessel, a second solid-liquid separation device to separate the second eluate from the second processing vessel to solid and liquid, and a second cesium adsorption tower to adsorb cesium from a supernatant provided by the second solid-liquid separation device. It is preferable to further comprise a second cesium adsorption tower to adsorb cesium from a supernatant provided by the second solid-liquid separation device, and a second regenerated solution circulation line to return a second regenerated solution resulting from cesium adsorption and removal by the second cesium adsorption tower into the second processing vessel.

Conveyor belts, sludge conveyors, sludge pumps, backhoes, dump trucks can be appropriately used as the solid-state material introduction means.

The fluoride introduction means and the second process liquid introduction means are not particularly limited, but chemical feeding tanks and pumps, and metering hoppers can be preferably used.

It is preferable to use the first and second processing vessels whose liquid-contacting area is lined or coated with resin, rubber or Teflon™ to prevent corrosion from fluoride. If the fluoride is an aqueous solution, the container does not necessarily require a lid, and a standard product such as a squared container can be used. The processing vessel should preferably be heatable. Faster processing is possible by raising the eluate temperature to approximately 60° C. Further, the first and second processing vessels can be appropriately equipped with an agitating means such as direct agitation by an agitator, a scraper, a circulating/mixing piping and a slurry-circulating pump, an aeration device, and a backhoe, depending on the size of the apparatus. When processing the coarse-grained fraction, a hurricane, a trammel, a drum washer, a spiral separator, a high mesh separator and the like can be used as the first and second processing vessels. If the amount to be processed is not gigantic, a cement mixer can be used as the processing vessel. A self-propelled cement mixer facilitates work in a small construction site. A piezoelectric element, a vibrator or an ultrasonic generator can further be provided on the processing device to improve contact.

The first and second solid-liquid separation devices are not particularly limited, and a common solid-liquid separation device can be used. For example, the solid-liquid separation of fine-grained fraction should preferably be performed by a centrifugal separation device in view of the processing speed and efficiency. On the other hand, the solid-liquid separation of coarse-grained fraction should be performed by a device selected appropriately according to the particle size. Typically, a vibrating grid is suitable for collecting gravel with a particle size of 80 mm or higher, a sprinkling screen for granule with a particle size of 2 mm or higher, a spiral screen for granule with a particle size of 2 mm or higher, similar to the sprinkling screen, as well as floating foreign matters, and a high mesh separator for sand with a particle size of 75 µm or higher.

The first and second cesium adsorption towers should be preferably filled with adsorbents, such as zeolite and Prussian blue.

The decontamination apparatus of the present invention should preferably be lined or coated with resin such as Teflon™ prevent corrosion by fluorides, at least in the area contacting liquid, but such lining or coating is not necessary for short-term use.

Advantageous Effect of Invention

The present invention removes radiocesium with more stability than the prior art by bringing soil, sludge in water supply and sewage systems and its burned ash, sediments in rivers, lakes, drainage systems, water ways, canals, harbors and hedoro which are contaminated by radiocesium in contact with fluorine ion, or more preferably, with fluorine ion and at least one of potassium ion, ammonium ion, sodium ion and hydrogen ion. In particular, soil contaminated by radiocesium can be brought in contact with a combination of fluorine ion and at least one of potassium ion, ammonium ion, sodium ion and hydrogen ion to achieve a radiocesium removal ratio of 60% or higher. Furthermore, 70% or more radiocesium can be removed by first bringing soil contaminated by radiocesium in contact with a combination of fluorine ion and at least one of potassium ion, ammonium ion, sodium ion and hydrogen ion, and then with acid. Additionally, a further reduction of radioactive concentration is possible by removing radiocesium from fine-grained soil obtained from the soil washing/classification process enabling a large volume reduction of radioactive waste.

DESCRIPTION OF EMBODIMENTS

The present invention is explained in detail below referring the attached drawings, but the invention is not limited thereby.

Figure 2:
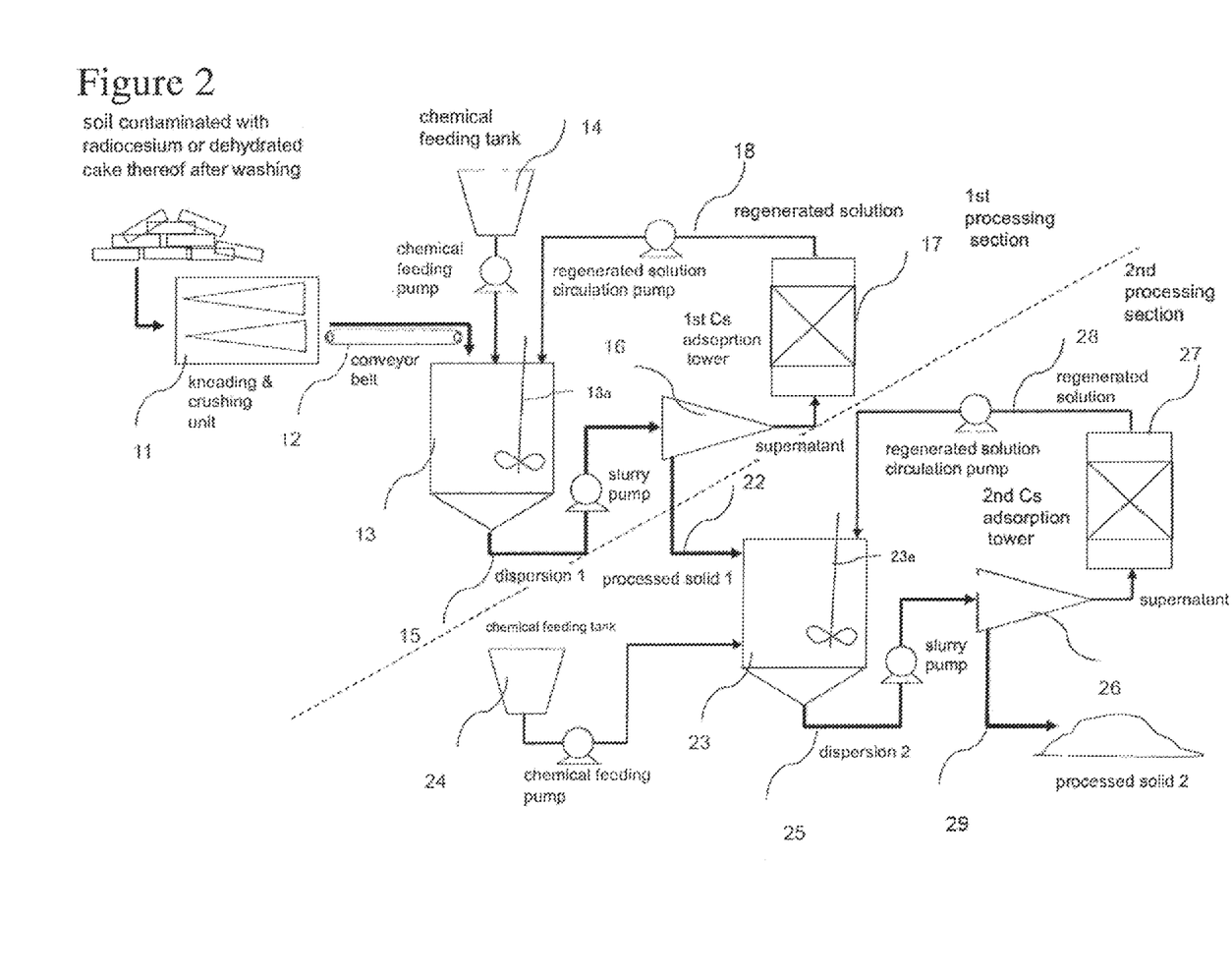
FIG. 2 is a schematic view showing an embodiment of a decontamination apparatus for the solid-state material contaminated by cesium of the present invention.

FIG. 2 is a schematic view showing an embodiment of a decontamination apparatus for a solid-state material containing cesium as the contaminant belonging to the present invention, which is preferable for processing a fine-grained fraction.

The decontamination apparatus for the solid-state material containing cesium as the contaminant, shown in FIG. 2, comprises (1) a first processing section equipped with a conveyor belt 12 which is a solid-state material introduction means to introduce a solid-state material containing radiocesium; a chemical feeding tank 14 which is a fluoride introduction means to introduce fluoride; a first processing vessel 13 to form a first eluate by bringing the solid-state material in contact with the first process liquid; a centrifugal separator 16 which is a first solid-liquid separation device to separate the first eluate from the first processing vessel 13 to solid and liquid; a first cesium adsorption tower 17 to adsorb cesium from a supernatant provided by the first solid-liquid separation device 16; and a first regenerated solution circulation line 18 to return a first regenerated solution resulting from cesium adsorption and removal by the first cesium adsorption tower into the firs processing vessel 13; and (2) a second processing section equipped with a second processing vessel 23 to form a second eluate by bringing a processed solid produced by the first solid-liquid separation device 16 in contact with the second processing solution containing an acidic material; a second chemical feeding tank 24 which is a second process liquid introduction means to introduce the second process liquid into the second processing vessel 23; a centrifugal separator 26 which is a solid-liquid separation device to separate the second eluate from the second processing vessel 23 to solid and liquid; a second cesium adsorption tower 27 to adsorb cesium from a supernatant provided by the second solid-liquid separation device 26; and a second regenerated solution circulation line 28 to return a second regenerated solution resulting from the cesium adsorption and removal by the second cesium adsorption tower 27 into the second processing vessel 23. However, the decontamination apparatus of the present invention may be composed of only the first processing section. In the embodiment in the drawing, the first processing vessel 13 and the second processing vessel 23 are respectively equipped with agitating means 13a and 23a.

Next, the decontamination method of the solid-state material containing cesium as the contaminant by using the apparatus of FIG. 2 is explained below.

The solid-state material containing radiocesium is crushed in the kneading/crushing machine 11 before it is fed to the decontamination apparatus of the present invention. The crushed contaminated matter is fed into the first processing vessel 13 using the conveyor belt 12. To the first processing vessel 13, the first process liquid containing fluoride is fed in an appropriate amount from the chemical feeding tank 14. In the first processing vessel 13, the solid-state material is brought into contact with the first process liquid to form the first eluate in a state of slurry, to elute cesium ion from the solid-state material 1 into the liquid phase. Then, the first eluate is taken out from the first processing vessel 13 and introduced into the first centrifugal separator 16 by a slurry pump for solid-liquid separation. The supernatant resulting from the solid-liquid separation using the first centrifugal separator 16 is introduced into the first cesium adsorption tower 17. The cesium ion is adsorbed to the cesium adsorbent in the first cesium adsorption tower 17. The regenerated solution after cesium ion is removed flows back into the first processing vessel 13 through the first regenerated solution circulation line 18. Meanwhile, the processed solid that is dehydrated by the first centrifugal separator 16 can be subjected to landfill disposal after it is washed with water, neutralized and dehydrated, if the measured radioactive concentration is down to the target value.

When the processed solid does not present a decrease in the radioactive concentration to the target value, the solid is introduced into the second processing vessel 23. To the second processing vessel 23, the second process liquid containing an acidic material is fed from the chemical feeding tank 24. In the second processing vessel 23, the processed solid is mixed with the second process liquid to form a second eluate. The second eluate is taken out of the second processing vessel 23, sent to the second centrifugal separator 26 by the slurry pump, and subjected again to solid-liquid separation to form a processed solid and a supernatant. The supernatant is sent to the second cesium adsorption tower 27, and the cesium ion is adsorbed to the cesium adsorbent in the tower. The regenerated solution after cesium ion is removed is returned to the second processing vessel 23 through the second regenerated solution circulation line 28. Meanwhile, the processed solid that has been dehydrated in the second centrifugal separator 26 is subjected to landfill disposal with reduced radioactive concentration after it is washed with water, neutralized and dehydrated.

The fluorine ion concentration of the first eluate formed in the first processing vessel 13 is determined by the content of the organic matter and the ratio of clay mineral present in the solid-state material, and the initial liquid phase concentration should preferably be approximately 0.1 to 110 g/L. The concentration of slurry in the first eluate is appropriately determined according to the method of agitation, the method of transfer and the length of the reaction time, for example, when the slurry is compressed and transferred using a slurry pump the desirable slurry concentration is approximately 5 to 200 g/L.

The concentration of acidic material added in the second process liquid to be introduced in the second processing vessel 23 is determined by the alkalinity of the subject solid and the ratio of clay mineral present therein, and the initial liquid phase concentration should preferably be approximately 0.01 to 1 mol/L. A desirable slurry concentration of the second eluate is approximately 5 to 200 g/L in a transfer using a pump when the slurry is compressed and transferred using a slurry pump like the first eluate.

In the above method, it is preferable for at least one of potassium ion, ammonium ion, sodium ion or hydrogen ion to be present in the first eluate. The potassium ion, ammonium ion, sodium ion or hydrogen ion can be added as salt in the first process liquid or the first eluate.

The processed solid can be washed with water before it is introduced into the second processing vessel 23 to reduce the fluorine ion concentration. The waste water after washing can be condensed using the reverse osmosis membrane module to be introduced into the first cesium adsorption tower 17 and reused as a regenerated solution.

Fluorine ion or the acidic material remaining in the regenerated solution, as well as any existing potassium ion, ammonium ion or sodium ion can be reused by returning the regenerated solution that has been separated in the first or second cesium adsorption tower respectively into the first or second reaction vessel.

EXAMPLES

The present invention is explained in detail below using Examples and Comparative Examples.

<Sample 1>

The surface andosol soil collected in September 2011 at the highly concentrated contamination site (hot spot) in Fukushima City was used as a sample of radiocesium-contaminated soil. The contaminated soil that had been collected was subjected to wet classification using a sieve of 88 μm, producing a fine-grained fraction of 0.088 mm or smaller. A dry soil sample formed by drying the obtained fine-grained fraction in a drier at 60° C. and a fired soil sample formed by heating the dry soil sample at 850° C. for an hour in a muffle furnace were used.

<Sample 2>

The surface andosol soil collected in November 2011 at the highly concentrated contamination site (hot spot) in Fukushima City was used as a sample of radiocesium-contaminated soil. The contaminated soil that had been collected was subjected to wet classification using a sieve of 75 μm, producing a coarse-grained fraction of 0.075 to 0.86 mm (fine-grained sand, medium sand). A dry soil sample formed by drying the obtained coarse-grained fraction in a drier at 60° C. was used.

<Sample 3>

The burned ash of the sludge in the sewage, collected in October 2011, was dried in a drier at 60° C. to be used as a sample of burned ash of a raidocesium-contaminated sludge of the sewage.

The removal ratio of radiocesium from the soil sample and the burned ash sample was assessed by the reduction ratio of the surface contamination count (CPM) derived from the β-ray and the γ-ray as read from the survey meter. Based on the report that almost all radioactive ray from contaminated soil and the burned ash of sludge in Japan in September 2011 is derived from radiocesium (Cs-134 (half life: 2.07 years) and Cs-137 (half life: 30.1 years) are at nearly equal levels), it is considered that the surface contamination count and the radiocesium concentration is proportional.

The concentration of radiocesium in the contaminated soil in the Fukushima Prefecture in September 2011 is estimated to be approximately 0.1 μg/kg or lower at most spots. Cesium of such low concentration cannot be measured, even if ICP-MS or the like is used, so a nonradioactive cesium of a high concentration of approximately 1 mg/kg is used in research. However, a distribution coefficient of cesium to soil/liquid is known to increase as the cesium concentration decreases, and when the inventors conducted a preliminary test, the test using a nonradioactive cesium of high concentration clearly exhibited high removal ratio than the test using the actual radiocesium-contaminated soil of low concentration. Hence, it is inappropriate to directly compare the decontamination test result of a contaminated soil of high concentration of nonradioactive cesium and a decontamination test result of the actual contaminated soil of low concentration of radiocesium.

<Measurement of the Surface Contamination Count>

In the Examples and Comparative Examples, the total amount of processed soil was filtered using a GF/B filter (produced by ADVANTEC Co.) of a diameter of 55 mm and put under sufficient suction to be formed into a cake, which cake was subsequently dried at 105° C. for an hour in a drier and subjected to a measurement of the surface contamination count.

The GM Survey Meter SUM-AD8 produced by Riken Keiki Co., Ltd. was used to measure the surface contamination count (CPM) from the β-ray and the γ-ray by spreading a plastic film on the measurement sample and pressing the measuring window against the film. After a sample of solid-state material contaminated by radiocesium was dispersed in the ion exchange water, it was similarly subjected to suction filtration for sufficient suction to be formed into a cake, which cake was subsequently dried at 105° C. and used as the control plot. The reduction ratio of the surface contamination count (CPM) of the processed sample from the surface contamination count (CPM) of the control plot was used to assess the removal ratio of cesium. The control plot was measured in every Example and Comparative Example. The measurement value of the control plot had a range of fluctuation of 9% at maximum. It should thus be noted that the removal ratio shown in the present Examples is presented as an average of measurement values with a range of fluctuation of approximately ±4.5%. It should also be noted that as a result of measuring the surface contamination count derived from the β-ray and the γ-ray in the present invention, the dosimetric value varies significantly by the water content of the measurement sample. The measurement sample after suction filtration exhibits low surface contamination count derived from the β-ray due to the shielding effect of water in wet soil. In fact, the value increased by approximately 25% for a measurement sample after drying at 105° C.

Example 1

The decontamination process of ammonium hydrogen fluoride+(sulfuric acid+KCl) in a soil sample dried at 60° C.

The soil sample dried at 60° C. (Sample 1) in an amount of 3 g was dispersed in 100 mL of 10 g/L ammonium hydrogen fluoride solution, and put in an ultrasonic cleaner VS-100III produced by AS ONE Company, and dispersed for 30 minutes under a frequency of 28 kHz. The result was washed twice in an ion-exchanged water, and subjected to suction filtration after centrifugal separation.

Next, the sample on the GF/B filter was dispersed in 100 mL of a mixed solution of 1 mol/L sulfuric acid and 20 g/L-KCL, then put in an ultrasonic cleaner to be dispersed for 30 minutes under a frequency of 28 kHz. The result was subjected to suction filtration and subsequently dried for 1 hour in a drier of 105° C., to be subjected to a measurement of the radioactivity dose. The result is shown in table 1.

TABLE 1

Decontamination test result of soil dried at 60° C. by preliminary processing using ammonium hydrogen fluoride + (sulfuric acid + KCl)

| Test System | | Process liquid | Condition | Process Time (min) | Process Temperature (° C.) | Removal Ratio of Radiocesium (%) |
|---|---|---|---|---|---|---|
| Example 1 | Process liquid 1 | 10 g/L-ammonium hydrogen fluoride | ultrasonic processing | 30 | 20 (room temperature) | 73 |
| | Process liquid 2 | 1 mol/L $H_2SO_4$ 20 g/L KCl | ultrasonic processing | 30 | ~40 | |

Comparative Examples 1 to 10

The soil samples dried at 60° C. (Sample 1) in an amount of 3 g were dispersed in 100 mL of different extracts free of fluoride, and extracted. The result is shown in Table 2.

TABLE 2

Decontamination test result of soil dried at 60° C. using no fluoride (Comparative Example)

| Test System | Extract | Condition | Extraction Time (min) | Extraction Temperature (° C.) | Removal Ratio of Radiocesium (%) |
|---|---|---|---|---|---|
| Comparative Example 1 | 1 mol/L $H_2SO_4$ | ultrasonic processing | 60 | 20 (room temp.) to 40 | <10 |
| Comparative Example 2 | 20 g/L KCl | ultrasonic processing | 60 | 20 (room temp.) to 40 | <10 |
| Comparative Example 3 | 1 mol/L $H_2SO_4$ 20 g/L KCl | pressurizing/heating (autoclave) | 45 | 120 | 36 |
| Comparative Example 4 | 1 mol/L $H_2SO_4$ | pressurizing/heating (autoclave) | 45 | 120 | 16 |
| Comparative Example 5 | 20 g/L KCl | pressurizing/heating (autoclave) | 45 | 120 | 28 |
| Comparative Example 6 | 20 g/L HCl | ultrasonic processing | 60 | 20 (room temp.) to 40 | <10 |
| Comparative Example 7 | 20 g/L KOH | ultrasonic processing | 60 | 20 (room temp.) to 40 | <10 |
| Comparative Example 8 | 2 g/L oxalic acid | heating | 60 | 95 to 100 | 33 |
| Comparative Example 9 | 1 mol/L $BaCl_2$ | ultrasonic processing | 60 | 20 (room temp.) to 40 | 17 |
| Comparative Example 10 | carbonated water | agitation in a sealed container | 20 hours | 20 (room temp.) | <10 |

According to the results of Example 1 and Comparative Examples 1 to 10, Comparative Example 3 (heating/pressurizing at 120° C. in a solution of 1 mol/L $H_2SO_4$ and 20 g/L KCl) showed a removal ratio of radiocesium of 36%, which was the greatest in test systems using no fluoride, but the ratio was merely half the removal ratio of radiocesium in Example 1 of 73%; this result demonstrates the advantageous effect of the present invention.

Examples 2 to 3

Experiments were conducted using similar conditions as Example 1 other than that the processing time using ammonium hydrogen fluoride was extended to 60 minutes and 120 minutes. The result is shown in Table 3.

TABLE 3

Decontamination test result 2 of soil dried at 60° C. using ammonium hydrogen fluoride + (sulfuric acid + KCl)

| Test System | | Process liquid | Condition | Process Time (min) | Process Temperature (° C.) | Removal Ratio of Radiocesium (%) |
|---|---|---|---|---|---|---|
| Example 2 | Process liquid 1 | 10 g/L-ammonium hydrogen fluoride | ultrasonic processing | 60 | 20 (room temp.) to 40 | 80 |
| | Process liquid 2 | 1 mol/L $H_2SO_4$ 20 g/L KCl | ultrasonic processing | 30 | | |
| Example 3 | Process liquid 1 | 10 g/L-ammonium hydrogen fluoride | ultrasonic processing | 120 | 20 (room temp.) to 40 | 83 |

TABLE 3-continued

Decontamination test result 2 of soil dried at 60° C. using ammonium hydrogen fluoride + (sulfuric acid + KCl)

| Test System | | Process liquid | Condition | Process Time (min) | Process Temperature (° C.) | Removal Ratio of Radiocesium (%) |
|---|---|---|---|---|---|---|
| | Process liquid 2 | 1 mol/L $H_2SO_4$ 20 g/L KCl | ultrasonic processing | 30 | | |

Examples 1 to 3 demonstrated that an extension in the processing time using ammonium hydrogen fluoride raised the removal ratio of radiocesium from the 70% level to the 80% level.

Example 4

Experiments were conducted using similar conditions as Example 2 other than that the process liquid 1 containing ammonium hydrogen fluoride and KCl were used. The result is shown in Table 4.

TABLE 4

Decontamination test result of soil dried at 60° C. with (ammonium hydrogen fluoride + KCl) + (sulfuric acid + KCl)

| Test System | | Process liquid | Condition | Process Time (min) | Process Temperature (° C.) | Removal Ratio of Radiocesium (%) |
|---|---|---|---|---|---|---|
| Example 4 | Process liquid 1 | 10 g/L-ammonium hydrogen fluoride 20 g/L KCl | ultrasonic processing | 60 | 20 (room temp.) to 40 | 81 |
| | Process liquid 2 | 1 mol/L $H_2SO_4$ 20 g/L KCl | ultrasonic processing | 30 | | |

There was no significant difference from the result of Example 2.

Example 5

Experiments were conducted using similar conditions as Example 4 other than that the process liquid 2 contained only sulfuric acid. The result is shown in Table 5.

TABLE 5

Decontamination test result of soil dried at 60° C. with (ammonium hydrogen fluoride + KCl) + sulfuric acid

| Test System | | Process liquid | Condition | Process Time (min) | Process Temperature (° C.) | Removal Ratio of Radiocesium (%) |
|---|---|---|---|---|---|---|
| Example 5 | Process liquid 1 | 10 g/L-ammonium hydrogen fluoride 20 g/L KCl | ultrasonic processing | 60 | 20 (room temp.) to 40 | 90 |
| | Process liquid 2 | 1 mol/L $H_2SO_4$ | ultrasonic processing | 30 | | |
| Example 6 | Process liquid 1 | 10 g/L-ammonium hydrogen fluoride 20 g/L KCl | ultrasonic processing | 60 | 20 (room temp.) to 40 | 95 |
| | Process liquid 2 | 1.8 mol/L $H_2SO_4$ | ultrasonic processing | 30 | | |

Processing with only sulfuric acid after decontaminating with process liquid 1 containing ammonium hydrogen fluoride and KCl improved the removal ratio of radiocesium from that of decontamination by the process liquid 2 containing sulfuric acid and potassium ion (Example 4), and an extremely high removal ratio of radiocesium of 90 to 95% was achieved.

Examples 7 to 10

Experiments were conducted using soil fired at 850° C. under conditions similar to Examples 2 to 4 and 6. The result is shown in Table 6.

TABLE 6

Decontamination Test Result of soil fired at 850° C. (Corresponding to conditions of Examples 2 to 5)

| Test System | Process liquid | | Condition | Process Time (min) | Process Temperature (° C.) | Removal Ratio of Radiocesium (%) |
|---|---|---|---|---|---|---|
| Example 7 | Process liquid 1 | 10 g/L-ammonium hydrogen fluoride | ultrasonic processing | 60 | 20 (room temp.) to 40 | 50 |
| | Process liquid 2 | 1 mol/L $H_2SO_4$ 20 g/L KCl | ultrasonic processing | 30 | | |
| Example 8 | Process liquid 1 | 10 g/L-ammonium hydrogen fluoride | ultrasonic processing | 120 | 20 (room temp.) to 40 | 53 |
| | Process liquid 2 | 1 mol/L $H_2SO_4$ 20 g/L KCl | ultrasonic processing | 30 | | |
| Example 9 | Process liquid 1 | 10 g/L-ammonium hydrogen fluoride 20 g/L KCl | ultrasonic processing | 60 | 20 (room temp.) to 40 | 69 |
| | Process liquid 2 | 1 mol/L $H_2SO_4$ 20 g/L KCl | ultrasonic processing | 30 | | |
| Example 10 | Process liquid 1 | 10 g/L-ammonium hydrogen fluoride 20 g/L KCl | ultrasonic processing | 60 | 20 (room temp.) to 40 | 77 |
| | Process liquid 2 | 1.8 mol/L $H_2SO_4$ | ultrasonic processing | 30 | | |

In all systems of samples of radiocesium-contaminated soil fired at 850° C., the removal ratio for the sample was lower compared to the sample of soil dried at 60° C. Although firing is effective for removing organic matters, it is considered to induce negative effects in the destruction of the end surface portion by the fluorine ion and the extraction of cesium.

Example 11

A burned ash sample (Sample 3) was used to conduct experiments similar to Example 10 using the process liquid shown in Table 7. The processing was conducted, not as an ultrasonic processing, but as machine agitation using a magnetic stirrer HS-50E-B, produced by As One Company. The result is shown in Table 7.

TABLE 7

Decontamination test result of burned ash of sludge in the sewage

| Test System | Process liquid | | Condition | Process Time (min) | Process Temperature (° C.) | Removal Ratio of Radiocesium(%) |
|---|---|---|---|---|---|---|
| Example 11 | Process liquid 1 | 10 g/L-ammonium hydrogen fluoride 50 g/L HCl 20 g/L KCl | stirrer agitation | 60 | 20 (room temp.) | 70 |
| | Process liquid 2 | 1.8 mol/L $H_2SO_4$ | stirrer agitation | 30 | | |

A test using a burned-ash sample, using the method of the present invention, also produced a removing ratio of radiocesium of 70%. The obtained removal ratio was similar to that of dried soil samples that were fired in Examples 9, 10, and implied similar effects of the heating process.

Examples 12 to 14

A soil sample (Sample 1) was used to conduct a single step machine agitation by a magnetic stirrer for 10 minutes using the process liquid shown in Table 8.

The concentration of the soil sample to be added was changed from 3 g per 100 mL, in Examples 1 to 11, to 15 g per 100 mL, and the concentration of ammonium hydrogen fluoride solution was raised concordantly from 10 g/L in Examples 1 to 11 to 50 g/L. The result is shown in Table 8.

TABLE 8

Decontamination test result of a soil sample of 150 g/L concentration, under 1 step processing (NH$_4$F/HF + KCl or sulfuric acid or hydrochloric acid), for 10 minutes

| Test System | Process liquid | Condition | Process Time (min) | Process Temperature (° C.) | Removal Ratio of Radiocesium (%) |
|---|---|---|---|---|---|
| Example 12 | 50 g/L-ammonium hydrogen fluoride 100 g/L KCl | stirrer agitation | 10 | 20 (room temp.) | 69 |
| Example 13 | 50 g/L-ammonium hydrogen fluoride 54 g/L H$_2$SO$_4$ | stirrer agitation | 10 | 20 (room temp.) | 70 |
| Example 14 | 50 g/L-ammonium hydrogen fluoride 46 g/L HCl | stirrer agitation | 10 | 20 (room temp.) | 68 |

A single step processing not including acidic wash in a later step also provided a removal ratio of radiocesium of approximately 70% to a reaction time of 10 minutes.

In Examples 13 and 14, ammonium hydrogen fluoride was put in co-existence with sulfuric acid or hydrochloric acid, instead of KCl, which was used as a co-existing material in the process liquid 1 of Examples 4, 5, 6, 9, 10 and 11, and consequently a removal ratio of radiocesium similar to Example 12 was obtained. It was shown that hydrogen ion derived from sulfuric acid or hydrochloric acid can replace potassium ion derived from KCl.

Examples 15 to 16

A soil sample (Sample 1) was used to conduct experiments similar to Example 12 other than that a process liquid shown in Table 9 was used. The result is shown in Table 9.

TABLE 9

Decontamination Test Result of a soil sample of 150 g/L concentration, under 1 step processing (NH$_4$F/HF + KCl alone or a combination of KCl and NaCl), for 10 minutes

| Test System | Process liquid | Condition | Process Time (min) | Process Temperature (° C.) | Removal Ratio of Radiocesium (%) |
|---|---|---|---|---|---|
| Example 15 | 50 g/L-ammonium hydrogen fluoride 20 g/L KCl | stirrer agitation | 10 | 20 (room temp.) | 35 |
| Example 16 | 50 g/L-ammonium hydrogen fluoride 20 g/L KCl 64 g/L NaCl | stirrer agitation | 10 | 20 (room temp.) | 63 |

As a result of decreasing the concentration of KCl to be added from 100 g/L of Example 12 to 20 g/L in Example 15, the removal ratio of radiocesium dropped to 35%. The conditions of Example 15 correspond to an amount of added salt totaling 7.52 mmol per 1 g of soil, consisting of 5.78 mmol of ammonium hydrogen fluoride and 1.74 mmol of KCl.

Contrastingly, in Example 16, NaCl was added to the process liquid composition of Example 15 to achieve an amount of added salt totaling 14.87 mmol per 1 g of soil, consisting of 5.78 mmol of ammonium hydrogen fluoride, 8.70 mmol KCl and 7.35 mmol NaCl. This concentration of salt nearly corresponds to the amount of added salt in Example 12 totaling 14.48 mmol per 1 g of soil, consisting of 5.78 mmol of ammonium hydrogen fluoride, and 8.70 mmol of KCl. Such condition for adding salt led to the recovery of the removal ratio of radiocesium to 63% in Example 16. This experiment result shows that the sodium ion derived from NaCl can replace potassium ion derived from KCl and that the removal ratio of radiocesium increases when the salt concentration per 1 g of soil is 10 mmol or higher.

Example 17

In a method complying with the test method of Examples 1 to 16, soil sample 2 was brought in contact with a process liquid containing fluorine ion to conduct a cesium removal test under the presence of at least one of potassium ion, ammonium ion, sodium ion or hydrogen ion. The test was conducted by keeping the amount of fluorine to be added constant (11.6 mmol/g soil), and changing the total amount (mmol per 1 g of soil) of salt or acid to be added for supplying potassium ion, ammonium ion, sodium ion or hydrogen ion. The relationship between the amount of added salt per 1 g of soil (mmol/g soil) and the removal ratio obtained by the test is shown in FIG. 3.

Figure 3:
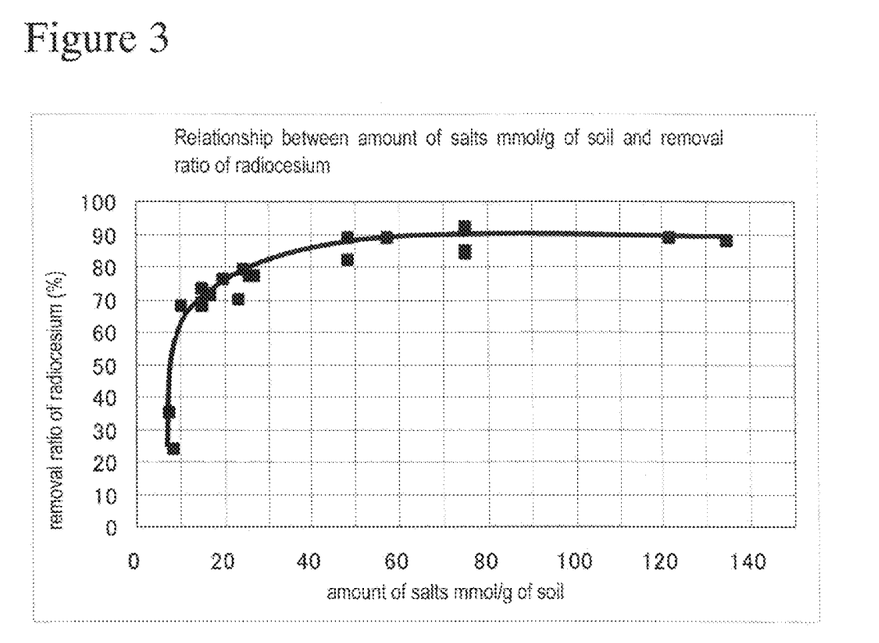
FIG. 3 is a graph showing the relationship between the amount of added salt to 1 g of soil (mmol/g soil) and the radiocesium removal ratio obtained in Example 17.

It was found, as shown in FIG. 3, that it is preferable to increase the amount of salt to be added per 1 g of soil to increase the removal ratio of radiocesium, and the amount of salt to be added is preferably 10 mmol or more per 1 g of soil, more preferably 20 mmol or more per 1 g of soil, and most preferably 50 mmol per 1 g of soil. The result also indicated that an addition of more than 50 mmol of salts per 1 g of soil does not increase the removal ratio of cesium any further. In actual processing, an addition of a high concentration of salt or acid leads to difficulties in processing waste liquid, so an amount of salts to be added suitable for actual production should be determined in view of the desired removal ratio.

Example 18

A soil sample (Sample 1) was used to conduct a single step processing using the processing solution and condition of Table 10. The concentration of the added soil sample was 3 g per 100 mL, as in Example 1, and the processing was conducted as machine agitation using a magnetic stirrer, for a reaction time of 60 minutes. The result is shown in Table 10.

TABLE 10

Decontamination test result of a soil sample of 30 g/L concentration, by 1 step processing (KF + KCl processing), for 60 minutes

| Test System | Process liquid | Condition | Process Time (min) | Process Temperature (° C.) | Removal Ratio of Radiocesium (%) |
|---|---|---|---|---|---|
| Example 18 | 19 g/L-potassium fluoride 50 g/L HCl | stirrer agitation | 60 | 20 (room temp.) | 69 |

Potassium fluoride was used in Example 18 instead of ammonium hydrogen fluoride used in Examples 1 to 16. A case of using potassium fluoride also provided a removal ratio of radiocesium of 69%.

It was possible to remove radiocesium in Example 18 even when no ammonium ion was present in the processing solution.

Examples 19 to 22

A soil sample (Sample 1) was used to conduct a single step processing using the process liquid and condition of Table 11.

The concentration of the added soil sample was 3 g per 100 mL, as in Example 1, and the processing was conducted as machine agitation using a magnetic stirrer for a reaction time of 10 minutes. The result is shown in Table 11.

Examples show that the radiocesium removal ratio continuously increased from the base 62% in Example 19 to 73%, 84% and 89%.

The result showed that potassium hydrogen fluoride contributes to the removal of radiocesium.

Examples 23 to 24

A soil sample (Sample 2: coarse-grained fraction) of 3 g was brought in contact with 100 mL of ammonium hydrogen fluoride+sulfuric acid solution, and it was subjected to a machine agitation using a magnetic stirrer HS-50E-B produced by As One Company. The result was washed twice with ion-exchanged water, and subjected to centrifugal separation, followed by suction filtration, then the result was dried in a drier of 105° C. for 1 hour and its radiation dose was measured. The result is shown in Table 12.

TABLE 11

Decontamination test result of a soil sample of 30 g/L concentration, by 1 step processing (KF/HF + NH$_4$F/HF + KCl processing), for 10 minutes

| Test System | Process liquid | Condition | Process Time (min) | Process Temperature (° C.) | Removal Ratio of Radiocesium (%) |
|---|---|---|---|---|---|
| Example 19 | 10 g/L-ammonium hydrogen fluoride 20 g/L KCl | stirrer agitation | 10 | 20 (room temp.) | 62 |
| Example 20 | 10 g/L-ammonium hydrogen fluoride 15 g/L-potassium hydrogen fluoride 20 g/L KCl | stirrer agitation | 10 | 20 (room temp.) | 73 |
| Example 21 | 10 g/L-ammonium hydrogen fluoride 44 g/L-potassium hydrogen fluoride 20 g/L KCl | stirrer agitation | 10 | 20 (room temp.) | 84 |
| Example 22 | 10 g/L-ammonium hydrogen fluoride 55 g/L-potassium hydrogen fluoride 20 g/L KCl | stirrer agitation | 10 | 20 (room temp.) | 89 |

In Examples 20 to 22, potassium hydrogen fluoride was added in addition to the process liquid composition of Example 19 to gradually elevate concentration, and the Example 23 showed that the radiocesium contamination of the coarse-grained fraction (fine-grained sand, medium sand) can be reduced by approximately 75% by the method of the

TABLE 12

Decontamination Test Result of soil (coarse-grained fraction) dried at 60° C. using ammonium hydrogen fluoride + sulfuric acid

| Test System | Process liquid | Condition | Process Time (min) | Process Temperature (° C.) | Removal Ratio of Radiocesium (%) |
|---|---|---|---|---|---|
| Example 23 | 10 g/L ammonium hydrogen fluoride 54 g/L H$_2$SO$_4$ | stirrer agitation | 10 | 20 (room temp.) | 75 |
| Example 24 | 5 g/L ammonium hydrogen fluoride 54 g/L H$_2$SO$_4$ | stirrer agitation | 10 | 20 (room temp.) | 65 | present invention. Further, Example 24 showed that even if the amount of ammonium hydrogen fluoride to be added is reduced to half the original amount, a removal ratio of 65% can be obtained.

Comparative Example 11

Table 13 shows the result of bringing 3 g of soil sample (Sample 3:coarse-grained fraction) in contact with 100 mL of sulfuric acid extract that is free of fluoride to perform extraction as in Examples 23 and 24.

TABLE 13

Decontamination Test Result of soil (coarse-grained fraction) dried at 60° C. using no ammonium hydrogen fluoride (Comparative Example)

| Test System | Extract | Condition | Extraction Time (min) | Extraction Temperature (° C.) | Removal Ratio of Radiocesium (%) |
|---|---|---|---|---|---|
| Comparative Example 11 | 54 g/L $H_2SO_4$ | stirrer agitation | 60 | 20 (room temp.) to 40 | 30 |

The results of Examples 23, 24 and Comparative Example 11 indicate that the coarse-grained fraction can be sufficiently decontaminated of radiocesium, and that the removal ratio of radiocesium in a test system using no fluoride is merely 30%.

What is claimed is:

1. A decontamination method of a solid-state material contaminated by radiocesium, comprising:
   bringing the solid-state material contaminated by radiocesium in contact with a first process aqueous solution liquid containing fluorine ion; and
   eluting cesium ion from the solid-state material to a liquid phase.

2. The decontamination method according to claim 1, comprising:
   bringing a processed solid obtained by eluting the cesium ion to the liquid phase in further contact with a second process aqueous solution liquid containing an acidic material; and
   eluting cesium ion remaining in the processed solid.

3. The decontamination method according to claim 1 or 2, wherein the fluorine ion is derived from fluoride selected from hydrogen fluoride gas, hydrofluoric acid and its salt, and fluorosilicate and its salt.

4. The decontamination method according to claim 3 wherein the fluoride is ammonium hydrogen fluoride, potassium hydrogen fluoride, potassium fluoride or sodium hydrogen fluoride.

5. The decontamination method according to claim 2, wherein the acidic material is selected from hydrochloric acid, nitric acid, phosphoric acid, sulfamic acid, and organic acid.

6. The decontamination method according to claim 1, wherein the solid-state material is a fine-grained fraction or a coarse-grained fraction which is obtained by a wash and classification process.

7. A decontamination method of a solid-state material contaminated by radiocesium comprising:
   bringing a solid-state material containing radiocesium as a contaminant in contact with a first process aqueous solution liquid containing fluorine ion, and
   eluting cesium ion from the solid-state material to a liquid phase under a presence of at least one of potassium ion, ammonium ion, sodium ion or hydrogen ion.

8. The decontamination method according to claim 7, further comprising:
   bringing processed solid obtained by eluting the cesium ion to the liquid phase into contact with a second process aqueous solution liquid containing an acidic material, and
   eluting the cesium ion remaining in the processed solid to a liquid phase.

9. The decontamination method according to claim 7, wherein the potassium ion, the ammonium ion, the sodium ion or the hydrogen ion present in the first process liquid is added as a salt or acid in an amount of 10 mmol or more to 1 g of solid-state material.

10. The decontamination method according to claim 7, wherein the fluorine ion is derived from fluoride selected from hydrogen fluoride gas, hydrofluoric acid and its salt, fluorosilicate and its salt.

11. The decontamination method according to claim 10, wherein the fluoride is ammonium hydrogen fluoride, potassium hydrogen fluoride, potassium fluoride or sodium hydrogen fluoride.

12. The decontamination method according to claim 7, wherein the acidic material is selected from hydrochloric acid, nitric acid, phosphoric acid, sulfamic acid, organic acid.

13. The decontamination method according to claim 7, wherein the solid-state material is a fine-grained fraction or a coarse-grained fraction resulting from a washing and classification process.

14. The decontamination method according to claim 1, wherein the solid-state material contaminated by radiocesium is contacted with the first process aqueous solution containing fluorine ion at a temperature of 20 to 60° C.

15. The decontamination method according to claim 7, wherein the solid-state material contaminated by radiocesium is contacted with the first process aqueous solution containing fluorine ion at a temperature of 20 to 60° C.

* * * * *